3,007,789
SYNERGISTIC HERBICIDAL COMPOSITION
Jack S. Newcomer, Wilson, Edward D. Weil, Lewiston, and Edwin Dorfman, Grand Island, N.Y., assignors to Hooker Chemical Corporation, Niagara Falls, N.Y., a corporation of New York
No Drawing. Filed Mar. 11, 1959, Ser. No. 798,586
4 Claims. (Cl. 71—2.4)

This invention relates to a synergistic herbicidal composition. More specifically this invention resides in a novel herbicidal composition comprising 2,3,6-trichlorophenylacetic acid and sodium chlorate. This application is a continuation-in-part of copending application Serial Number 692,046 filed in the United States Patent Office on October 24, 1957.

The herbicidal mixtures of this invention possess new and unobvious properties not logically predictable from the individual activities of the ingredient compounds. The surprising effect of this mixture is that the ingredient compounds enhance the effect of each other. Thus, applicants have found that the composition of this invention is more herbicidally active than would be expected on the basis of the additivity of the two ingredient compounds.

As a herbicide, it is particularly useful in places where it is undesirable to have plant growth such as along railroad right of ways, highway guard rails, golf courses, pipelines, etc. Soil sterilization of this type in the prior are has been quite costly and a major need exists for soil sterilants which are effective and yet economical. The composition of this invention because of the desirable activities of its components and because of the large degree of synergism between the two compounds provides such a sterilant.

2,3,6-trichlorophenylacetic acid alone not only controls the weeds present at the time of application, but it has a high residual effect in controlling the emergence of weeds from the soil over considerable periods of time ranging up to two years after application, depending on the rates of application. Sodium chlorate has been a well-known herbicide in the agricultural field. Combinations of 2,3,6-trichlorophenylacetic acid or its derivatives with sodium chlorate are far more herbicidally active than would be expected on the basis of additivity. One may use a derivative which can readily hydrolyze in the soil to the acid, for example, a salt, amide, ester, acid chloride, or anhydride. Preferred derivatives are the sodium salt and the amide, for economic reasons and for ease of formulation. The derivatives included in this invention are listed in copending application Serial Number 730,051, filed in the United States Patent Office on April 22, 1958. The rates, however, for convenience sake will be given throughout this disclosure in terms of the acid.

Since a fire hazard may exist when one uses an alkali metal chlorate, it is preferred that a fire-retardant, such as sodium borates, sodium carbonate, calcium chloride, or magnesium chloride, be used. It is also preferred to use the composition of this invention in aqueous solutions, or as dry solids. Solid carriers such as clay, a borate mineral or vermiculite may also be included when the dry formulation is used. Formulations may contain emulsifying agents, such as sorbitol laurates, wetting agents, and carriers in accordance with the well-established practices in the herbicidal field. Combinations of this herbicide with other known herbicides which may or may not be involved in the synergistic effect may be used without departing from the spirit of this invention.

Applicants prefer to employ a range of from one to forty pounds per acre of 2,3,6-trichlorophenylacetic acid for from fifty to two thousand pounds per acre of sodium chlorate. It is obvious, however, that this invention is intended to include any combination of 2,3,6-trichlorophenylacetic acid and sodium chlorate which produces this synergistic effect. The following examples will further illustrate the present invention.

EXAMPLE 1

A representative formulation of the invention was prepared by mixing the following:

| | Parts by weight |
|---|---|
| Sodium 2,3,6-trichlorophenylacetate | 4 |
| Sodium chlorate | 200 |
| Sodium borate (as fire retardant) | 200 |
| Water | Desired amount |

EXAMPLE 2

The following example illustrates the synergistic effect of the compositions of this invention.

A test area in Erie County, New York, infested with quack-grass, wild carrot, chicory, dock, ragweed, plantain, oxalis, daisy, yarrow, foxtail, hedge bindweed, and mustard was sprayed with aqueous solutions of this test chemical at the rates indicated in Table I below, and the results inspected one year later.

Table I

| Rate in Lbs./Acre of Chemical | Percent Weed Control [1] |
|---|---|
| 1. (5)-2,3,6-Trichlorophenylacetic Acid [2] | 0–5 |
| 2. (10)-2,3,6-Trichlorophenylacetic Acid [2] | 25 |
| 3. (20)-2,3,6-Trichlorophenylacetic Acid [2] | 70 |
| 4. (40)-2,3,6-Trichlorophenylacetic Acid [2] | 70–95 |
| 5. (200)-Sodium Chlorate | 0 |
| 6. (400)-Sodium Chlorate | 0 |
| 7. (800)-Sodium Chlorate | 25 |
| 8. (1500)-Sodium Chlorate | 45 |
| 9. (10)-2,3,6-Trichlorophenylacetic Acid [2] plus (200)-Sodium Chlorate | 99–100 |
| 10. (5)-2,3,6-Trichlorophenylacetic Acid [2] plus (800)-Sodium Chlorate | 95–100 |

[1] Reduction of weed population of test plot relative to untreated control plot.
[2] As sodium salt.

EXAMPLE 3

Test plots infested with fern, sedge grass, honeysuckle, crabgrass, sumac, locust, and sassafras seedlings were sprayed in early spring with aqueous solution of the test chemicals. A late summer inspection showed the results given below in Table II.

Table II

| Rate in Lbs./Acre of Chemical | Percent Average Weed Control |
|---|---|
| 1. (4)-2,3,6-Trichlorophenylacetic Acid | 40 |
| 2. (200)-Sodium Chlorate [1] | 20 |
| 3. (4)-2,3,6-Trichlorophenylacetic Acid plus (200)-Sodium Chlorate [1] | 95–100 |

[1] Plus 112 lbs./acre of sodium carbonate as a fire retardant.

The examples of the composition of our invention, and methods of preparing and utilizing them, which have been described in the foregoing specification, have been given for purpose of illustration, not limitation. Many other modifications and ramifications will naturally suggest themselves to those skilled in the art, based on the disclosure of our basic discovery. These are intended to be comprehended within the scope of our invention.

We claim:
1. A herbicidal composition consisting of a ratio of

2,3,6-trichlorophenylacetic acid to sodium chlorate of about 4:5 to 1:2000.

2. A herbicidal composition consisting of a ratio of 2,3,6-trichlorophenylacetic acid to sodium chlorate of about 1:10 to 1:400.

3. A herbicidal composition consisting of a ratio of 2,3,6-trichlorophenylacetic acid to sodium chlorate of about 4:5 to 1:2000, said composition having added thereto a fire-retardant amount of a compound selected from the group consisting of sodium borate, sodium carbonate, calcium chloride, and magnesium chloride.

4. A method of controlling weeds which comprises applying from 1 to 40 pounds of 2,3,6-trichlorophenylacetic acid in combination with from 50 to 2000 pounds of sodium chlorate per acre of locus to be treated.

References Cited in the file of this patent

UNITED STATES PATENTS

| | | |
|---|---|---|
| 2,589,162 | Taylor | Mar. 11, 1952 |
| 2,709,648 | Ryker et al. | May 31, 1955 |
| 2,847,293 | Harris et al. | Aug. 12, 1958 |